United States Patent
Nakagawa

(10) Patent No.: US 12,002,937 B2
(45) Date of Patent: Jun. 4, 2024

(54) VEHICLE AND NON-CONTACT POWER FEEDING APPARATUS

(71) Applicant: SUBARU CORPORATION, Tokyo (JP)

(72) Inventor: Isao Nakagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 356 days.

(21) Appl. No.: 15/833,413

(22) Filed: Dec. 6, 2017

(65) Prior Publication Data

US 2018/0277911 A1 Sep. 27, 2018

(30) Foreign Application Priority Data

Mar. 22, 2017 (JP) .................................. 2017-056087

(51) Int. Cl.
*H02J 7/00* (2006.01)
*B60L 1/02* (2006.01)
(Continued)

(52) U.S. Cl.
CPC ............. *H01M 10/625* (2015.04); *B60L 1/02* (2013.01); *B60L 53/00* (2019.02); *B60L 53/12* (2019.02);
(Continued)

(58) Field of Classification Search
CPC ............. H01M 10/615; H01M 10/625; H01M 10/443; H02J 7/025
(Continued)

(56) References Cited

U.S. PATENT DOCUMENTS

2012/0280575 A1* 11/2012 Kim .................... H02J 7/00047
307/104
2013/0082652 A1 4/2013 Jung
(Continued)

FOREIGN PATENT DOCUMENTS

CN 103036318 A 4/2013
CN 103918192 A 7/2014
(Continued)

OTHER PUBLICATIONS

JPO Notification of Reasons for Refusal dated Aug. 27, 2018 and English translation.
JPO Decision of Grant dated Feb. 22, 2018 and English translation.
Chinese Office Action, dated Aug. 30, 2022, in Chinese Application No. 201711320430.1.

*Primary Examiner* — Samuel Berhanu
(74) *Attorney, Agent, or Firm* — MCGINN I.P. LAW GROUP, PLLC

(57) ABSTRACT

A vehicle includes a secondary battery, a power receiver, a charger, a heat generator, and a battery temperature raising unit. The power receiver receives an electromagnetic wave to generate electric power. The charger charges the secondary battery by using the electric power generated by the power receiver. The heat generator receives the electromagnetic wave to generate heat. The battery temperature raising unit raises temperature of the secondary battery by using the heat generator as a heat source. A part of a heat generation band, which is a frequency band of the electromagnetic wave in which the heat generator has an increased heat generation efficiency, does not overlap a power generation band, which is a frequency band of the electromagnetic wave in which the power receiver has an increased power generation efficiency, and a part of the power generation band does not overlap the heat generation band.

19 Claims, 11 Drawing Sheets

(51) Int. Cl.
*B60L 53/00* (2019.01)
*B60L 53/12* (2019.01)
*B60L 58/27* (2019.01)
*H01M 10/44* (2006.01)
*H01M 10/46* (2006.01)
*H01M 10/615* (2014.01)
*H01M 10/625* (2014.01)
*H01M 10/657* (2014.01)
*H02J 50/10* (2016.01)
*B60L 50/64* (2019.01)
*H01M 10/48* (2006.01)
*H01M 50/204* (2021.01)

(52) U.S. Cl.
CPC .......... *B60L 58/27* (2019.02); *H01M 10/443* (2013.01); *H01M 10/46* (2013.01); *H01M 10/615* (2015.04); *H01M 10/657* (2015.04); *H02J 7/0013* (2013.01); *H02J 7/0047* (2013.01); *H02J 7/0048* (2020.01); *H02J 7/007194* (2020.01); *H02J 50/10* (2016.02); *B60L 50/64* (2019.02); *B60L 2240/662* (2013.01); *H01M 10/48* (2013.01); *H01M 10/486* (2013.01); *H01M 50/204* (2021.01); *H01M 2220/20* (2013.01)

(58) Field of Classification Search
USPC ................................................ 320/108, 150
See application file for complete search history.

(56) References Cited

U.S. PATENT DOCUMENTS

| | | | |
|---|---|---|---|
| 2014/0168019 A1 | 6/2014 | Hirobe et al. | |
| 2014/0305722 A1 | 10/2014 | Ichikawa et al. | |
| 2016/0031330 A1* | 2/2016 | Ishigaki | B60L 11/182 |
| | | | 307/10.1 |
| 2016/0105036 A1 | 4/2016 | Raghunathan et al. | |
| 2016/0149176 A1* | 5/2016 | Hsu | H05K 5/0086 |
| | | | 429/7 |
| 2016/0218549 A1 | 7/2016 | Hirobe et al. | |
| 2016/0294223 A1* | 10/2016 | Kim | B60L 53/126 |
| 2016/0352138 A1 | 12/2016 | Hirobe et al. | |
| 2017/0136900 A1* | 5/2017 | Murata | B60L 53/14 |
| 2017/0179773 A1* | 6/2017 | Kim | H01F 27/2804 |
| 2017/0245679 A1* | 8/2017 | Watts | H05B 6/1236 |
| 2019/0165436 A1* | 5/2019 | Kuboki | H01M 10/647 |

FOREIGN PATENT DOCUMENTS

| | | | |
|---|---|---|---|
| CN | 103946046 A | | 7/2014 |
| CN | 105515217 A | | 4/2016 |
| JP | 2003-070170 A | | 3/2003 |
| JP | 2010-268664 A | | 11/2010 |
| JP | 2010268664 A | * | 11/2010 |
| JP | 2012-156083 A | | 8/2012 |
| JP | 2013-112047 A | | 6/2013 |

* cited by examiner

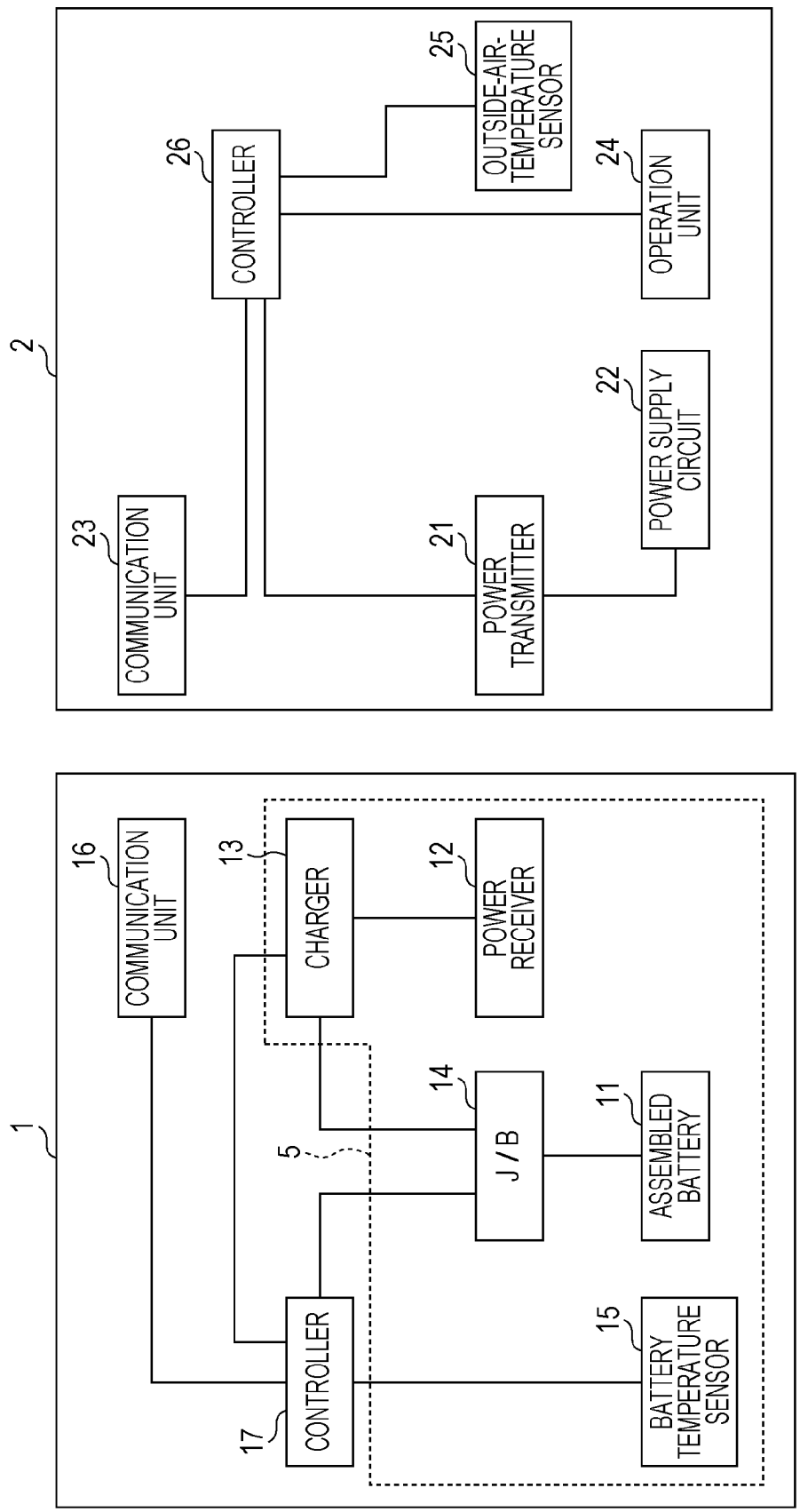

VEHICLE AND NON-CONTACT POWER FEEDING APPARATUS

CROSS-REFERENCE TO RELATED APPLICATIONS

The present application claims priority from Japanese Patent Application No. 2017-056087 filed on Mar. 22, 2017, the entire contents of which are hereby incorporated by reference.

BACKGROUND

1. Technical Field

The present invention relates to a vehicle equipped with a secondary battery and a non-contact power feeding apparatus that performs non-contact power feeding to the vehicle. More particularly, the present invention relates to a technical field of adjusting temperature of a secondary battery by using an electromagnetic wave.

2. Related Art

Electrically powered vehicles, such as hybrid vehicles and electric vehicles, in which wheels can be driven by power supplied by motor-generators (hereinafter, referred to as motors) are equipped with batteries (secondary batteries) that feed electric power to the motors.

Batteries of some electrically powered vehicles, for instance, plug-in hybrid electric vehicles can be charged by supplying electric power to the vehicles from an external power supply such as a commercial alternating-current (AC) power supply by using a cable.

If a vehicle-mounted battery has a low temperature when the battery is charged using an external power supply, the internal resistance of the battery may increase, which consequently decreases the charging efficiency. Thus, raising the temperature of the battery is effective.

In terms of techniques for charging a vehicle-mounted battery by using an external power supply, non-contact power feeding is conceived as a replacement of a technique of supplying electric power by using a cable. In addition, the use of an electromagnetic wave transmitted by a power transmitter to raise temperature of vehicle-mounted batteries is also conceived in the case where non-contact power feeding is performed to vehicles for charging, (see, for instance, Japanese Unexamined Patent Application Publication (JP-A) No. 2010-268664).

JP-A No. 2010-268664 discloses a non-contact power feeding system for a vehicle, which is capable of raising temperature of a device by using an electromagnetic field generated during power feeding. In the non-contact power feeding system, electric power is transmitted via an electromagnetic field between a power transmitting unit included in power feeding equipment external to a vehicle and a power receiving unit mounted in the vehicle. JP-A No. 2010-268664 discloses that a device for which temperature needs to be raised in the vehicle is placed in close proximity to the power receiving unit so that the temperature is raised using the electromagnetic field. JP-A No. 2010-268664 further discloses that an electromagnetic wave absorber that absorbs electromagnetic waves is disposed on an outer surface of the target device so that the temperature is raised efficiently.

At non-low temperatures (ordinary temperatures), the temperature of the battery need not be raised and charging alone is to be performed.

According to the invention disclosed in JP-A No. 2010-268664, when charging alone is performed without performing temperature raising for the target device, the vehicle is parked so that the target device is located outside the electromagnetic field generated by the power transmitting unit. That is, the parking position of the vehicle needs to be changed between the case where both of charging and temperature raising are performed and the case where charging alone is performed.

SUMMARY OF THE INVENTION

It is desirable to implement, as a vehicle charging system capable of charging a secondary battery of a vehicle and raising temperature of the secondary battery by using an electromagnetic wave transmitted by a power transmitter, a system capable of selectively performing charging and temperature raising without requiring displacement of the vehicle.

An aspect of the present invention provides a vehicle including a secondary battery, a power receiver configured to receive an electromagnetic wave to generate electric power, a charger configured to charge the secondary battery by using the electric power generated by the power receiver, a heat generator configured to receive the electromagnetic wave to generate heat, and a battery temperature raising unit configured to raise temperature of the secondary battery by using the heat generator as a heat source. A part of a heat generation band does not overlap a power generation band, and a part of the power generation band does not overlap the heat generation band. The power generation band is a frequency band of the electromagnetic wave in which the power receiver has an increased power generation efficiency, and the heat generation band is a frequency band of the electromagnetic wave in which the heat generator has an increased heat generation efficiency.

Another aspect of the present invention provides a non-contact power feeding apparatus configured to perform non-contact power feeding to a vehicle. The apparatus includes a power transmitter and a controller. The power transmitter is configured to transmit an electromagnetic wave. The controller is configured to change a frequency of the electromagnetic wave transmitted by the power transmitter in accordance with temperature information.

Another aspect of the present invention provides a non-contact power feeding apparatus configured to perform non-contact power feeding to a vehicle. The apparatus includes a power transmitter and circuitry. The power transmitter is configured to transmit an electromagnetic wave. The circuitry is configured to change a frequency of the electromagnetic wave transmitted by the power transmitter in accordance with temperature information.

BRIEF DESCRIPTION OF THE DRAWINGS

FIG. 1 is a block diagram illustrating a configuration of a vehicle charging system according to an example;

DETAILED DESCRIPTION

Figure 2A:
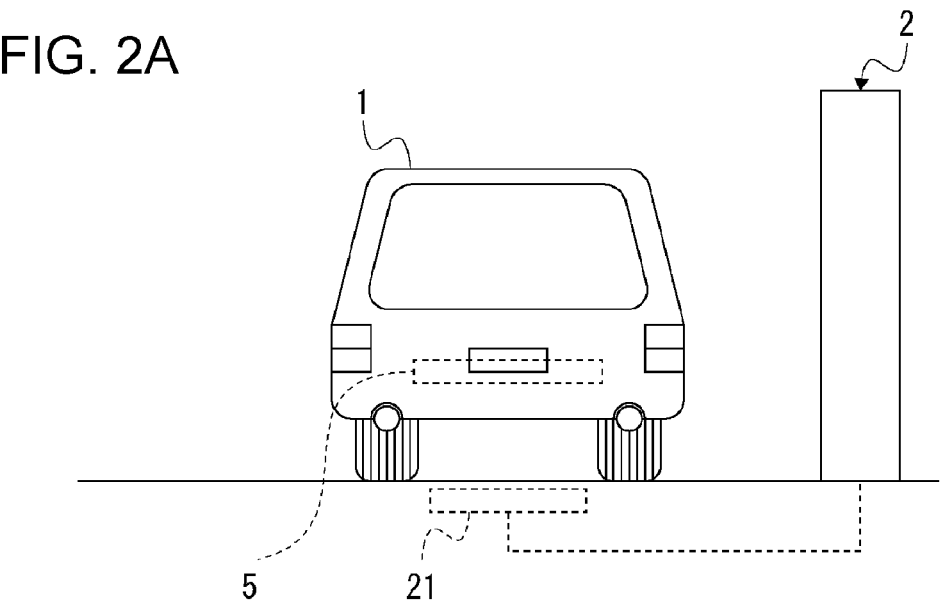
FIGS. 2A and 2B are diagrams schematically illustrating an exemplary external appearance of the vehicle charging system according to the example.
Figure 2B:
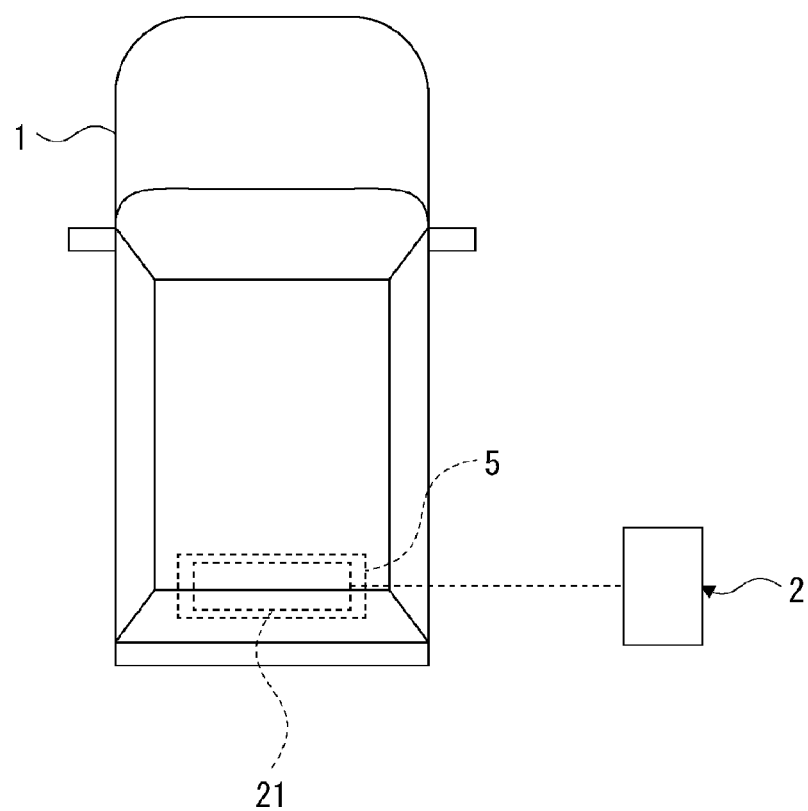

FIG. 1 is a block diagram illustrating a configuration of a vehicle charging system according to an example of the present invention. FIGS. 2A and 2B are diagrams schematically illustrating an exemplary external appearance of the vehicle charging system.

The vehicle charging system according to the example includes a vehicle 1 and a non-contact power feeding apparatus 2. The vehicle 1 is, for instance, an electrically powered vehicle, such as a hybrid vehicle or an electric vehicle, in which wheels can be driven by power supplied by a motor-generator (hereinafter, referred to as a motor). The non-contact power feeding apparatus 2 includes a power transmitter 21 and performs non-contact power feeding to the vehicle 1.

The vehicle 1 includes an assembled battery 11, a power receiver 12, a charger 13, a junction box (J/B) 14, a battery temperature sensor 15, a communication unit 16, and a controller 17 (see FIG. 1). The assembled battery 11 is used as a power supply of the motor. The power receiver 12 receives an electromagnetic wave transmitted from the power transmitter 21 to generate electric power. The charger 13 charges a secondary battery by using the electric power generated by the power receiver 12. In one example, the assembled battery 11 may serve as the secondary battery. The junction box 14 includes a relay circuit and switches between connections/disconnections between the assembled battery 11 and other electric circuits. The battery temperature sensor 15 is disposed in the vicinity of the assembled battery 11 and detects temperature of the assembled battery 11. The communication unit 16 enables data communication between the vehicle 1 and an external apparatus. The controller 17 controls operations of the charger 13, the junction box 14, and the communication unit 16.

The power receiver 12, the charger 13, the junction box 14, and the battery temperature sensor 15 are accommodated in a battery pack 5 that accommodates the assembled battery 11. Note that the controller 17 may be accommodated in the battery pack 5.

The assembled battery 11 includes a plurality of battery cells 11a, which are secondary batteries, for instance, lithium-ion batteries or nickel-hydrogen batteries. The plurality of battery cells 11a are coupled in series or in parallel to one another. The assembled battery 11 has a relatively high output voltage, for instance, several hundreds of volts (V).

The communication unit 16 performs wireless communication according to a predetermined communication standard in this example.

The controller 17 includes a signal processing device, such as a microcomputer, including a central processing unit (CPU), a read-only memory (ROM), and a random access memory (RAM), for instance. The controller 17 performs various processes for managing the assembled battery 11.

The battery temperature sensor 15 is coupled to the controller 17. Thus, the controller 17 is able to obtain temperature of the assembled battery 11. The controller 17 performs data communication with an external apparatus of the vehicle 1, particularly, the non-contact power feeding apparatus 2 (a controller 26 described later) in this case, via the communication unit 16.

Although an illustration is omitted, the controller 17 is connected to an in-vehicle local area network (LAN), for instance, a controller area network (CAN), built in the vehicle 1. Thus, the controller 17 is able to transmit and receive various signals to and from an electronic control unit (ECU) connected to the in-vehicle LAN and to share information with the ECU.

The controller 17 performs processes for managing the assembled battery 11. For instance, the controller 17 performs a process of obtaining a state of charge (SOC) of the assembled battery 11, a process of controlling a charging operation performed by the charger 13 to charge the assembled battery 11, and a process of controlling on/off of the relay circuit of the junction box 14.

In addition to the power transmitter 21, the non-contact power feeding apparatus 2 includes a power supply circuit 22, a communication unit 23, an operation unit 24, an outside-air-temperature sensor 25, and the controller 26. The power supply circuit 22 supplies a supply voltage to the power transmitter 21. The communication unit 23 enables data communication between the non-contact power feeding apparatus 2 and an external apparatus. The operation unit 24 includes members to be operated by a user to perform various operation inputs and outputs information (operation input information) corresponding to an operation input. The outside-air-temperature sensor 25 detects outside air temperature. The controller 26 controls an operation of the power transmitter 21.

The power transmitter 21 transmits an electromagnetic wave in accordance with an instruction from the controller 26. In this example, the power transmitter 21 is capable of changing the frequency of the electromagnetic wave that is transmitted.

In this example, non-contact power feeding from the power transmitter 21 to the power receiver 12 is performed based on resonance. In such a case, each of the power transmitter 21 and the power receiver 12 includes a coil (resonant coil), and the coils have a substantially equal natural frequency. The two coils resonate with each other in a magnetic field (or an electric field), and consequently electric power is transmitted from one of the coils to the other coil via the magnetic field.

A frequency band of the electromagnetic wave transmitted by the power transmitter 21 is, for instance, a 2.4-GHz band.

The communication unit 23 performs wireless communication according to a predetermined communication standard.

The controller 26 includes a signal processing device, such as a microcomputer, including a CPU, a ROM, and a RAM, for instance. The controller 26 controls the entirety of the non-contact power feeding apparatus 2.

The controller 26 performs data communication with an external apparatus of the non-contact power feeding apparatus 2, particularly, the vehicle 1 (the controller 17) in this case, via the communication unit 23.

The controller 26 also controls an electromagnetic wave transmission operation performed by the power transmitter 21, in accordance with operation input information supplied thereto from the operation unit 24. In addition, the controller 26 controls the electromagnetic wave transmission operation performed by the power transmitter 21, in accordance with information about the outside air temperature detected by the outside-air-temperature sensor 25 and information obtained from the vehicle 1 via the communication unit 23.

Specific processes performed by the controller 26 in this example will be described later.

The non-contact power feeding apparatus 2 is installed in a predetermined charging facility having a parking space for the vehicle 1. For instance, the power transmitter 21 of the non-contact power feeding apparatus 2 is partially or entirely buried in the ground in the parking space (see FIG. 2A) and transmits an electromagnetic wave toward the vehicle 1 from underneath.

The battery pack 5 that accommodates the assembled battery 11, the power receiver 12, etc. of the vehicle 1 is placed at a space under the floor of the vehicle cabin at a rear portion of the vehicle 1 (see FIGS. 2A and 2B). The vehicle 1 is parked at a predetermined position in the parking space such that the coil of the power receiver 12 faces the coil of the power transmitter 21 when the assembled battery 11 is charged.

Figure 3A:
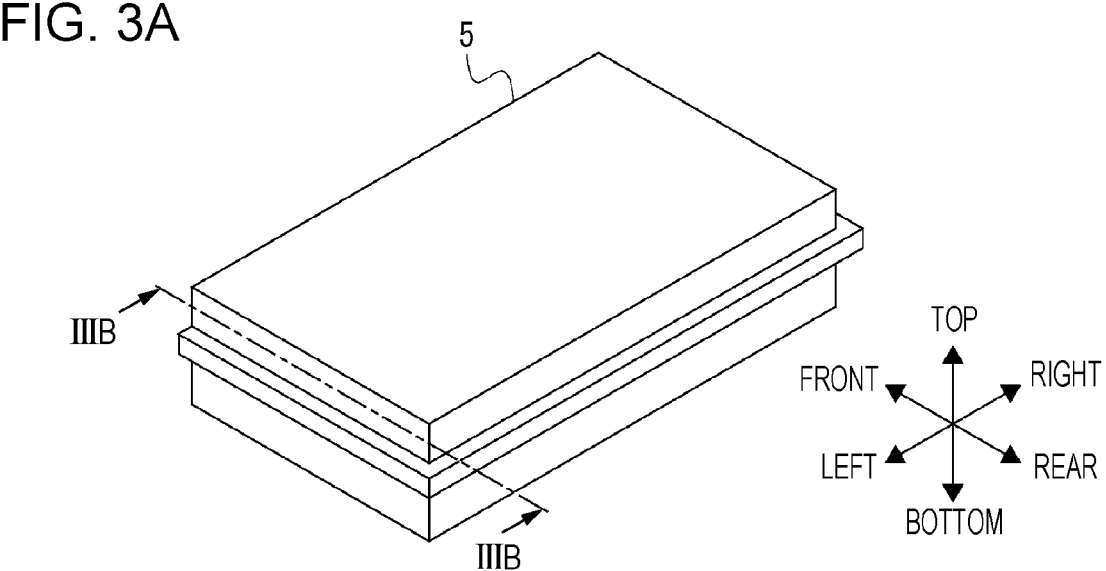
FIGS. 3A to 3C are diagrams illustrating a configuration of a battery pack in accordance with the example.
Figure 3B:
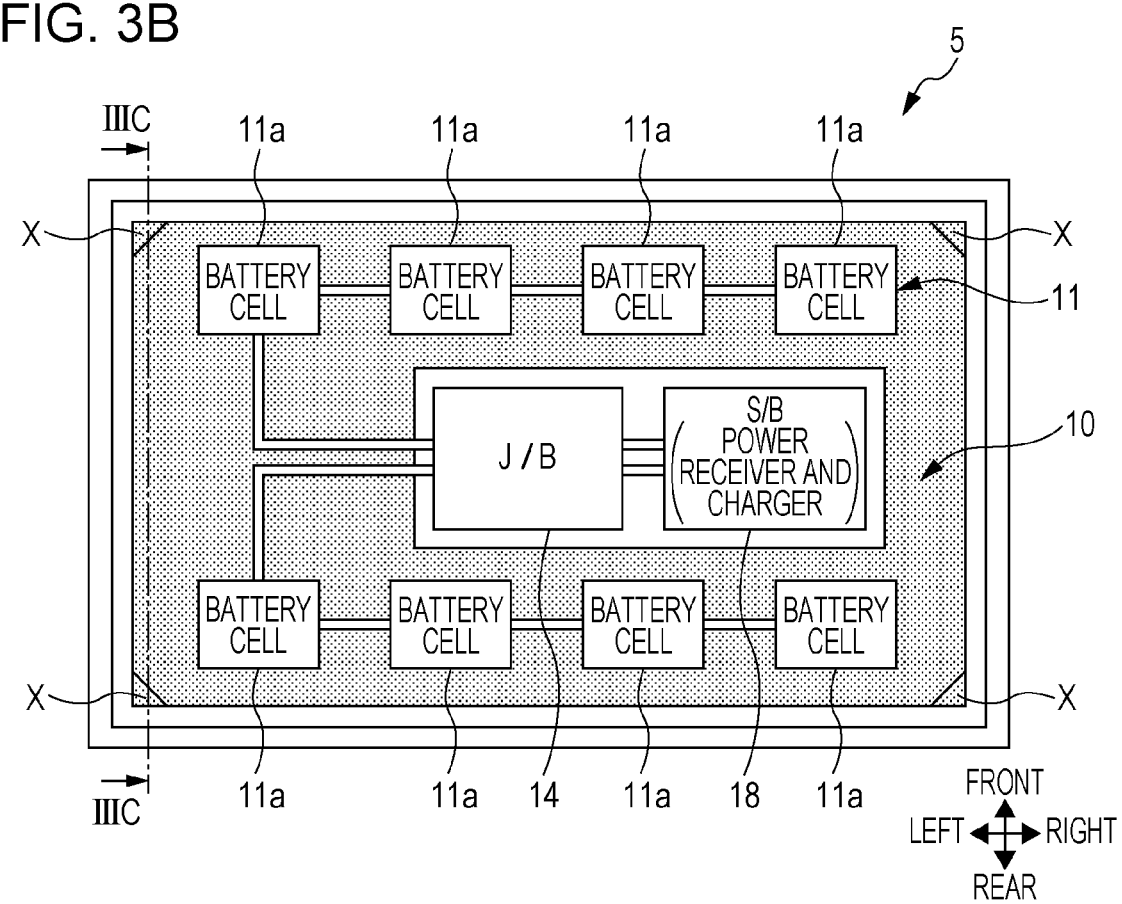
Figure 3C:
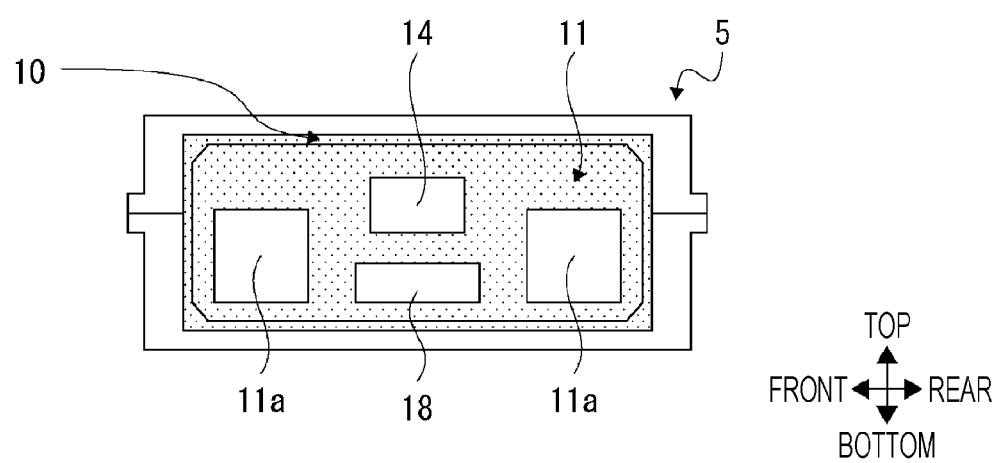

FIGS. 3A, 3B, and 3C are diagrams illustrating a configuration of the battery pack 5 in accordance with the example. Specifically, FIG. 3A is a schematic perspective view of an external appearance of the battery pack 5, FIG. 3B is a top view of a cut model obtained by horizontally cutting the battery pack 5 along line IIIB-IIIB illustrated in FIG. 3A, and FIG. 3C is a left side view of a cut model obtained by cutting the battery pack 5 in a front-rear direction along line IIIC-IIIC illustrated in FIG. 3B.

Note that top-bottom, left-right, and front-rear directions illustrated in FIGS. 3A to 3C indicate directions determined when the battery pack 5 is mounted in the vehicle 1.

In this example, the battery pack 5 has a substantially rectangular-parallelepiped shape that is long sideways. The battery pack 5 includes the plurality of battery cells 11a of the assembled battery 11, the junction box 14, and a supply box (S/B) 18 within an outer casing thereof. The supply box 18 is a box that accommodates the power receiver 12 and the charger 13 within an outer casing thereof.

FIG. 3B illustrates the battery cells 11a that are coupled in series to one another, for instance. Alternatively, at least some of the battery cells 11a are coupled in parallel to the other battery cells 11a in the assembled battery 11.

In the battery pack 5 according to this example, two battery rows, each of which includes the plurality of battery cells 11a disposed in the left-right direction, are disposed in the front-rear direction (see FIG. 3B). The junction box 14 and the supply box 18 are disposed in the left-right direction between these battery rows in the front-rear direction. As illustrated in FIG. 3C, the supply box 18 is placed below the junction box 14 so as to be close to the lower surface of the outer casing of the battery pack 5.

In the battery pack 5 according to the example, a heat generator 10 that receives an electromagnetic wave to generate heat is disposed in the vicinity of each of the battery cells 11a. In this example, the heat generator 10 has a sheet-like shape and is attached to substantially the entire inner surface of the outer casing of the battery pack 5.

Note that, in this example, the heat generator 10 is not disposed in regions of the inner surface of the outer casing of the battery pack 5 that are located closely above and below the junction box 14 and the supply box 18 (see FIG. 3B) in consideration of the facts that the junction box 14 has high operation stability at relatively low temperatures and the power receiver 12 accommodated in the supply box 18 receives an electromagnetic wave to generate heat in no small quantities.

Partially increasing the thickness of the heat generator 10 in the battery pack 5 is effective to increase the efficiency of raising the temperatures of the battery cells 11a. FIG. 3B illustrates an exemplary case where the thickness of the heat generator 10 is increased at four corners X of the battery pack 5 when gaps between panels constituting the outer casing of the battery pack 5 are located at the respective corners X.

Increasing the thickness of the heat generator 10 at portions close to the battery cells 11a is conceivable to increase the temperature raising efficiency. It is also effective to increase the thickness of the heat generator 10 at portions where the gaps of the panels of the outer casing of the battery pack 5 are located other than at the corners X.

In addition, a fan for sending air to the battery cells 11a may be provided to increase the temperature raising efficiency.

In this example, a member obtained by forming (for instance, vapor-depositing) an aluminum film onto a polyethylene terephthalate (PET) film is used as the heat generator 10 having a sheet-like shape.

In such a case, the heat generator 10 has frequency characteristics (heat generation characteristics against frequency) that the heat generation efficiency increases in a predetermined frequency band of an electromagnetic wave which the heat generator 10 receives. Hereinafter, a frequency band of an electromagnetic wave in which the heat generator 10 has an increased heat generation efficiency in this manner is referred to as a "heat generation band Bh".

The power receiver 12 also has predetermined frequency characteristics against an electromagnetic wave. Specifically, the power receiver 12 has characteristics that the power generation efficiency increases in a predetermined frequency band of an electromagnetic wave. Hereinafter, a frequency band of an electromagnetic wave in which the power receiver 12 has an increased power generation efficiency in this manner is referred to as a "power generation band Be".

Figure 4:
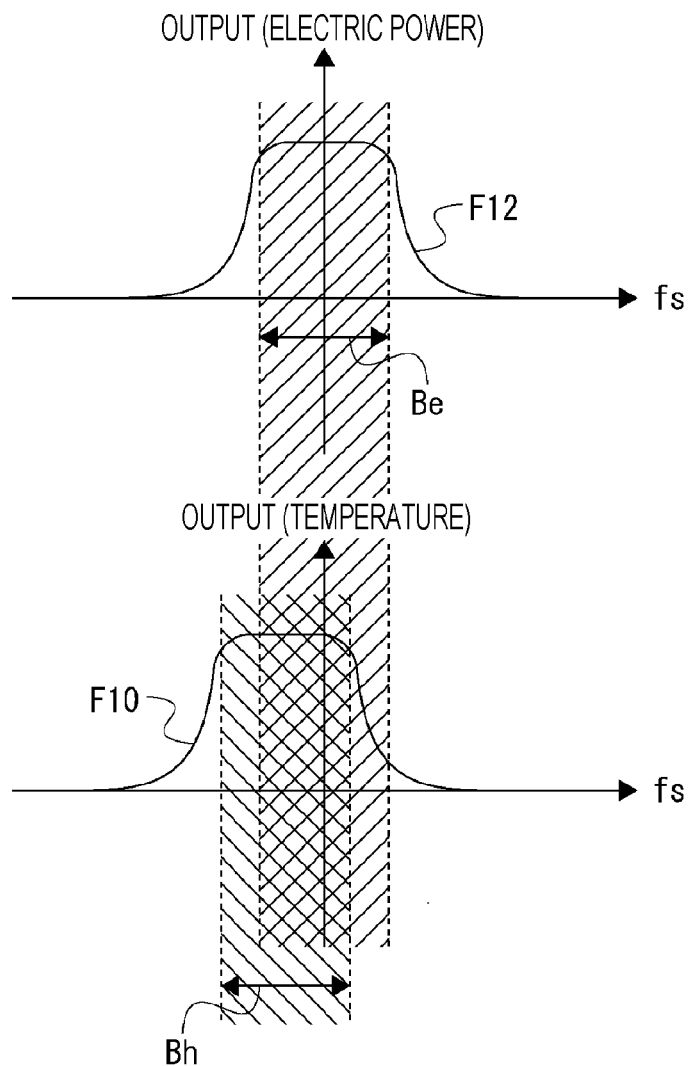
FIG. 4 is diagram illustrating a relationship between a power generation band and a heat generation band in accordance with the example.

FIG. 4 is a diagram illustrating a relationship between the power generation band Be and the heat generation band Bh in accordance with the example. Specifically, an upper diagram illustrates frequency characteristics F12 and the power generation band Be of the power receiver 12, and a lower diagram illustrates frequency characteristics F10 and the heat generation band Bh of the heat generator 10.

As illustrated in FIG. 4, the power generation band Be is a frequency band in which an amount of generated electric power is maintained at a predetermined level or higher, and the heat generation band Bh is a frequency band in which an amount of generated heat (temperature) is maintained at a predetermined level or higher. In this example, the bandwidth of the power generation band Be is wider than the bandwidth of the heat generation band Bh.

In this example, a part of the heat generation band Bh does not overlap the power generation band Be, and a part of the power generation band Be does not overlap the heat generation band Bh. Further, in this example, another part of the heat generation band Bh overlaps the power generation band Be (an overlapping region of a region hatched with lines inclined leftward and region hatched with lines inclined rightward in FIG. 4).

Such a relationship between the power generation band Be and the heat generation band Bh enables a state in which one of charging and temperature raising is selectively performed and a state in which both of charging and temperature raising are performed to be switched between by adjusting the frequency of the electromagnetic wave transmitted from the power transmitter 21.

Figure 5:
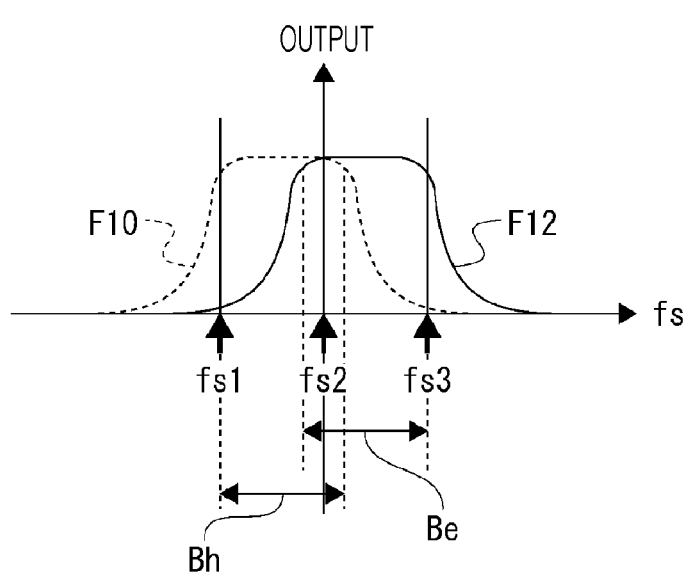
FIG. 5 is a diagram for describing frequency adjustment for switching between a state in which one of charging and temperature raising is selectively performed and a state in which both of charging and temperature raising are performed.

Specifically, by setting the frequency of the electromagnetic wave transmitted from the power transmitter 21 to a frequency "fs2" in FIG. 5, that is, a frequency in an overlapping band of the power generation band Be and the heat generation band Bh, a state is successfully implemented in which both the amount of electric power generated by the power receiver 12 (an amount of electric power fed to the assembled battery 11) and the amount of heat generated by the heat generator 10 are increased. In addition, by setting the frequency of the electromagnetic wave to a frequency "fs3" in FIG. 5, that is, a frequency in a part of the power generation band Be that does not overlap the heat generation band Bh, a state is successfully implemented in which the amount of electric power generated by the power receiver 12 is increased and the amount of heat generated by the heat generator 10 is suppressed. Further, by setting the frequency of the electromagnetic wave to a frequency "fs1" in FIG. 5, that is, a frequency in a part of the heat generation band Bh that does not overlap the power generation band Be, a state is successfully implemented in which the amount of electric power generated by the power receiver 12 is suppressed and the amount of heat generated by the heat generator 10 is increased.

That is, on/off of charging and on/off of temperature raising are separately controllable as needed by adjusting the frequency of the electromagnetic wave.

Figure 6:
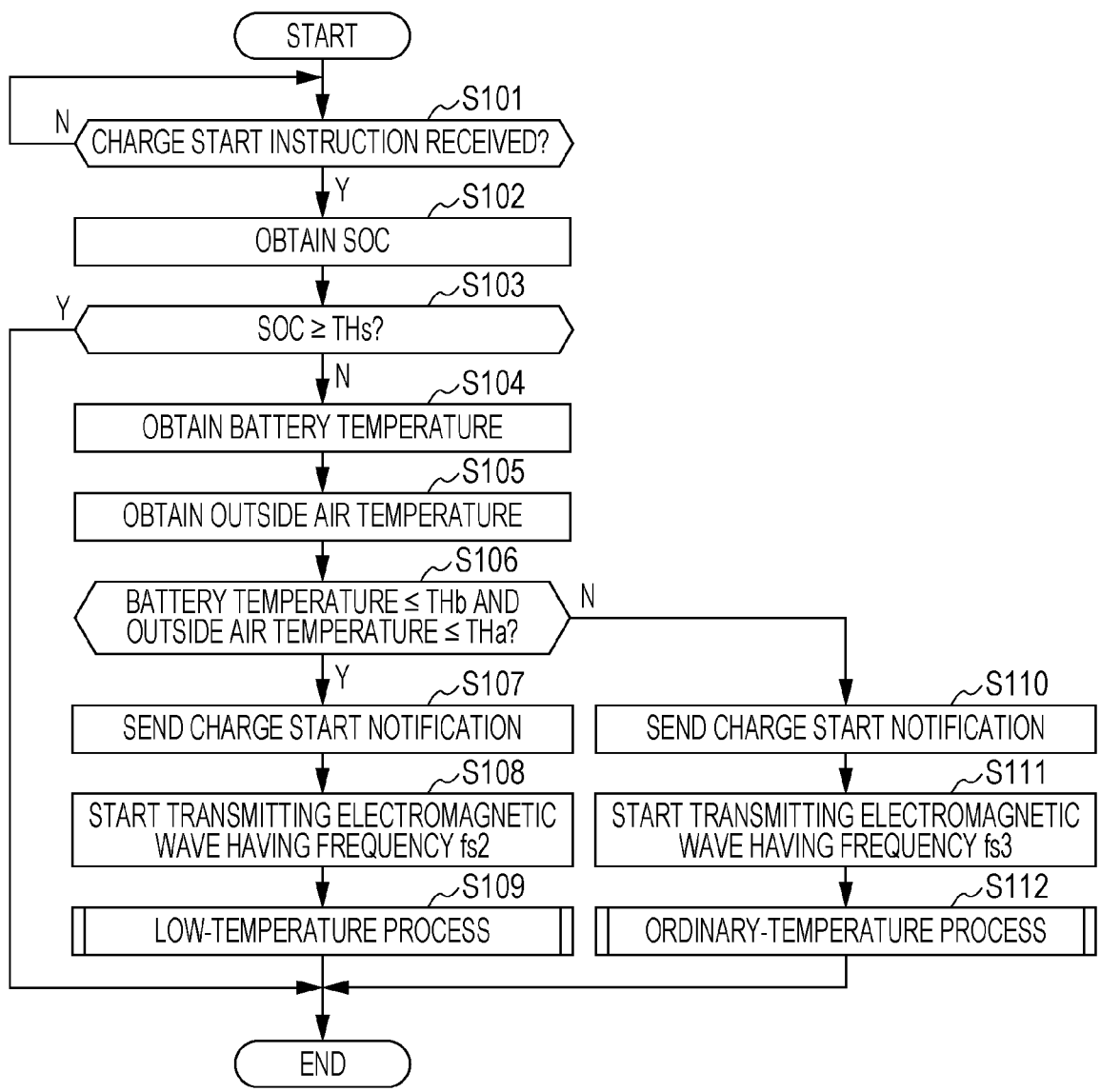
FIG. 6 is a flowchart illustrating a control process relating to charging and temperature raising according to the example.

The non-contact power feeding apparatus 2 according to this example performs a control process relating to charging and temperature raising as illustrated in FIG. 6 on the assumption that the power receiver 12 and the heat generator 10 have the characteristics described above.

Note that the process illustrated in FIG. 6 is performed by the controller 26 of the non-contact power feeding apparatus 2 in accordance with a program stored in a predetermined storage device, such as the aforementioned ROM, for instance.

First, in step S101, the controller 26 waits for a charge start instruction. In this example, the charge start instruction is given in response to a user, such as a driver of the vehicle 1, performing a predetermined operation input by using the operation unit 24 of the non-contact power feeding apparatus 2, for instance. Thus, the controller 26 waits for the predetermined operation input in step S101.

Upon determining that the charge start instruction is given in response to the predetermined operation input, the process proceeds to step S102, in which the controller 26 performs an SOC obtaining process to obtain the SOC of the assembled battery 11 from the controller 17 of the vehicle 1 via the communication unit 23. Then, in step S103, the controller 26 determines whether the SOC is greater than or equal to a charge-not-required threshold THs. The charge-not-required threshold THs is set to a value that is at least less than or equal to "1" (100%). The controller 26 determines whether the SOC of the assembled battery 11 is high enough so that charging is not required through the processing of step S103.

Upon determining in step S103 that the SOC is greater than or equal to the charge-not-required threshold THs, the controller 26 ends the process illustrated in FIG. 6. That is, the assembled battery 11 is not charged in this case.

On the other hand, upon determining that the SOC is less than the charge-not-required threshold THs, the controller 26 performs a battery temperature obtaining process in step S104 and an outside-air-temperature obtaining process in step S105. Then, the process proceeds to step S106. The battery temperature obtaining process of step S104 is a process of obtaining battery temperature information representing the temperature of the assembled battery 11 from the controller 17 of the vehicle 1 via the communication unit 23. The outside-air-temperature obtaining process of step S105 is a process of obtaining information about the outside air temperature based on a detection signal of the outside-air-temperature sensor 25.

In step S106, the controller 26 determines whether the battery temperature is lower than or equal to a threshold THb and whether the outside air temperature is lower than or equal to a threshold THa. The thresholds THb and THa may be equal to each other or different from each other.

If the battery temperature is lower than or equal to the threshold THb and the outside air temperature is lower than or equal to the threshold THa, the controller 26 sends a charge start notification to the controller 17 of the vehicle 1 via the communication unit 23 in step S107. The controller 26 then causes the power transmitter 21 to start transmitting an electromagnetic wave having the frequency fs2 (see FIG. 5) in step S108.

In response to the charge start notification, the controller 17 of the vehicle 1 causes the charger 13 to start charging the assembled battery 11. Since the electromagnetic wave having the frequency fs2 is transmitted in this case, a state is implemented in which both the amount of electric power fed to the assembled battery 11 and the amount of heat generated by the heat generator 10 are increased.

In response to the start processing of step S108, the controller 26 performs a low-temperature process in step S109 and then ends the process illustrated in FIG. 6.

Upon determining in step S106 that the battery temperature is not lower than or equal to the threshold THb and the outside air temperature is not lower than or equal to the threshold THa, the controller 26 sends a charge start notification to the controller 17 in step S110. The controller 26 then causes the power transmitter 21 to start transmitting an electromagnetic wave having the frequency fs3 (see FIG. 5) in step S111.

In this way, the state is successfully implemented in which the amount of electric power fed to the assembled battery 11 is increased and the amount of heat generated by the heat generator 10 is suppressed when the temperature of the assembled battery 11 need not be raised. That is, the state in which charging of the assembled battery 11 alone is mainly performed is successfully implemented.

In response to the start processing of step S111, the controller 26 performs an ordinary-temperature process in step S112 and then ends the process illustrated in FIG. 6.

Figure 7:
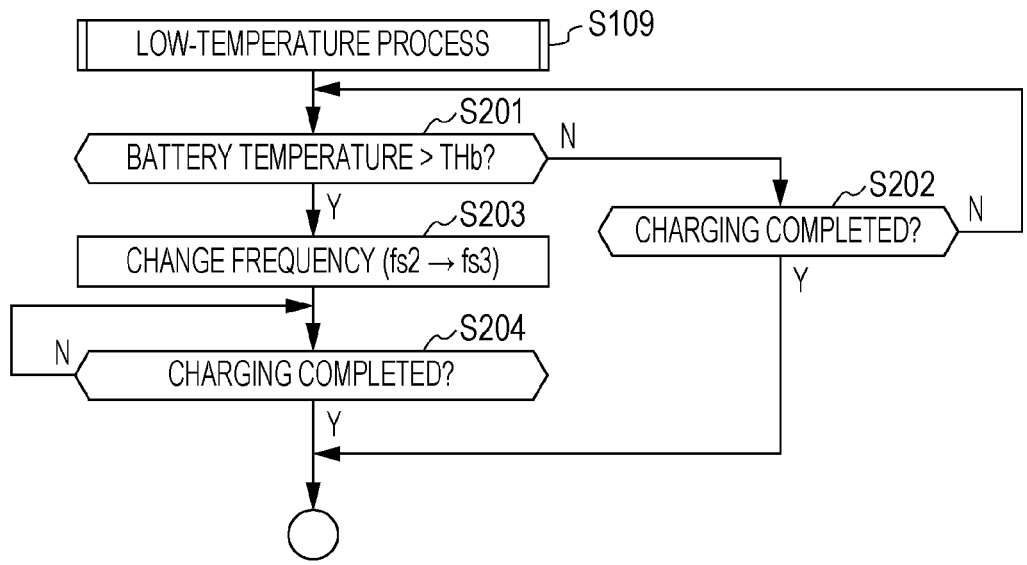
FIG. 7 is a flowchart of a low-temperature process in accordance with the example.

FIG. 7 illustrates a processing procedure that is performed as the low-temperature process in step S109.

First, the controller 26 waits for one of a state in which the battery temperature becomes higher than the threshold THb and a state in which charging of the assembled battery 11 is completed through determination processing of steps S201 and S202. In step S201, the controller 26 obtains the battery temperature information from the controller 17 via the communication unit 23. In addition, the determination processing of step S202 may be processing performed by the controller 26 to determine whether the SOC of the assembled battery 11 has become equal to "1" on the basis of the SOC information obtained from the controller 17. Alternatively, in the case where the controller 17 performs charge completion determination processing on the basis of the SOC and notifies the controller 26 of the result, the determination processing of step S202 may be processing of determining whether the notification is received.

Upon determining in step S202 that charging is completed, the controller 26 ends the low-temperature process illustrated in FIG. 7. Although an illustration is omitted, the controller 26 causes the power transmitter 21 to stop transmitting the electromagnetic wave upon determining that charging is completed.

Upon determining in step S201 that the battery temperature is higher than the threshold THb, the controller 26 performs frequency changing processing in step S203. Specifically, the controller 26 instructs the power transmitter 21 to change the frequency of the transmitted electromagnetic wave from the frequency fs2 to the frequency fs3.

Then in step S204, the controller 26 waits for completion of charging. Upon the completion of charging, the controller 26 ends the low-temperature process illustrated in FIG. 7.

As described above, in the case where both of charging and temperature raising are started at low temperatures, the state is shifted to the state in which heat generation by the heat generator 10 is suppressed and charging alone is mainly performed if the battery temperature is raised to a predetermined value or higher during charging of the assembled battery 11. As a result, an excessive rise in temperature of the assembled battery 11 is avoided.

Figure 8:
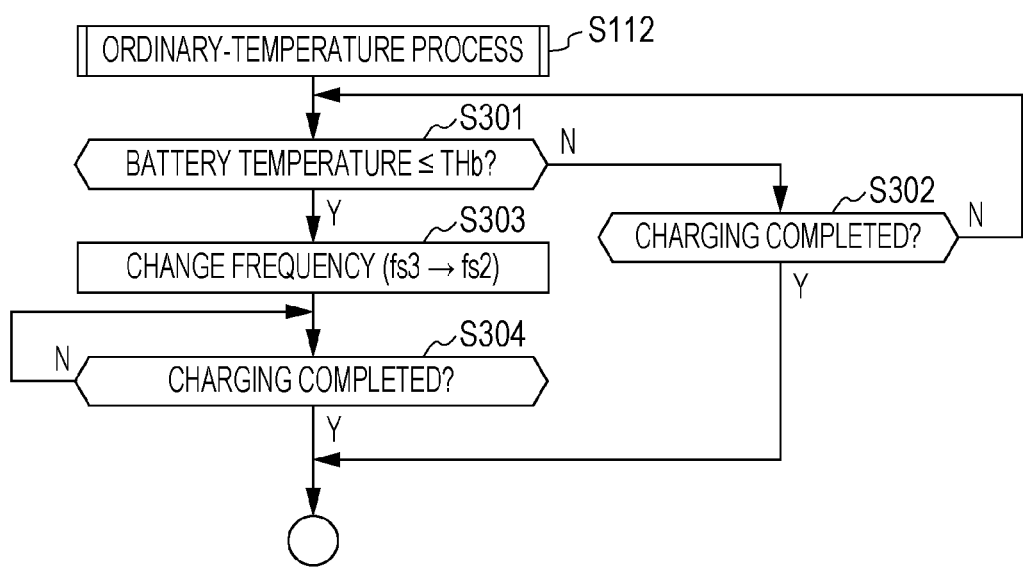
FIG. 8 is a flowchart of an ordinary-temperature process in accordance with the example.

FIG. 8 illustrates a processing procedure that is performed as the ordinary-temperature process in step S112.

In FIG. 8, the controller 26 waits for one of a state in which the battery temperature becomes lower than or equal to the threshold THb and a state in which charging of the assembled battery 11 is completed through determination processing of steps S301 and S302. As in step S201 described above, the controller 26 obtains the battery temperature information from the controller 17 via the communication unit 23 in step S301.

Upon determining in step S302 that charging is completed, the controller 26 ends the ordinary-temperature process illustrated in FIG. 8.

Upon determining in step S301 that the battery temperature is lower than or equal to the threshold THb, the controller 26 performs frequency changing processing in step S303. Specifically, the controller 26 instructs the power transmitter 21 to change the frequency of the transmitted electromagnetic wave from the frequency fs3 to the frequency fs2.

Then in step S304, the controller 26 waits for completion of charging. Upon the completion of charging, the controller 26 ends the ordinary-temperature process illustrated in FIG. 8.

As described above, in the case where charging alone is started at ordinary temperatures (non-low temperatures), the state is shifted to the state in which the amount of heat generated by the heat generator 10 is increased and both of charging and temperature raising are performed if the battery temperature decreases to the predetermined temperature or lower during charging of the assembled battery 11. As a result, a situation where the charging efficiency of the assembled battery 11 is maintained low because of a decrease in air temperature caused during charging of the assembled battery 11 and the time taken for charging increases is successfully avoided.

The time at which the vehicle 1 is to start traveling after being charged is settable in the non-contact power feeding apparatus 2 through an operation input performed using the operation unit 24, for instance. In such a case, if a period from completion of charging to the start time is relatively long, the battery temperature may decrease before the start time comes and consequently the output characteristics of the assembled battery 11 may deteriorate. In this case, the vehicle 1 starts traveling at the start time in a state in which the output characteristics of the assembled battery 11 are not good. This may consequently decrease the driver's comfortableness.

Figure 9:
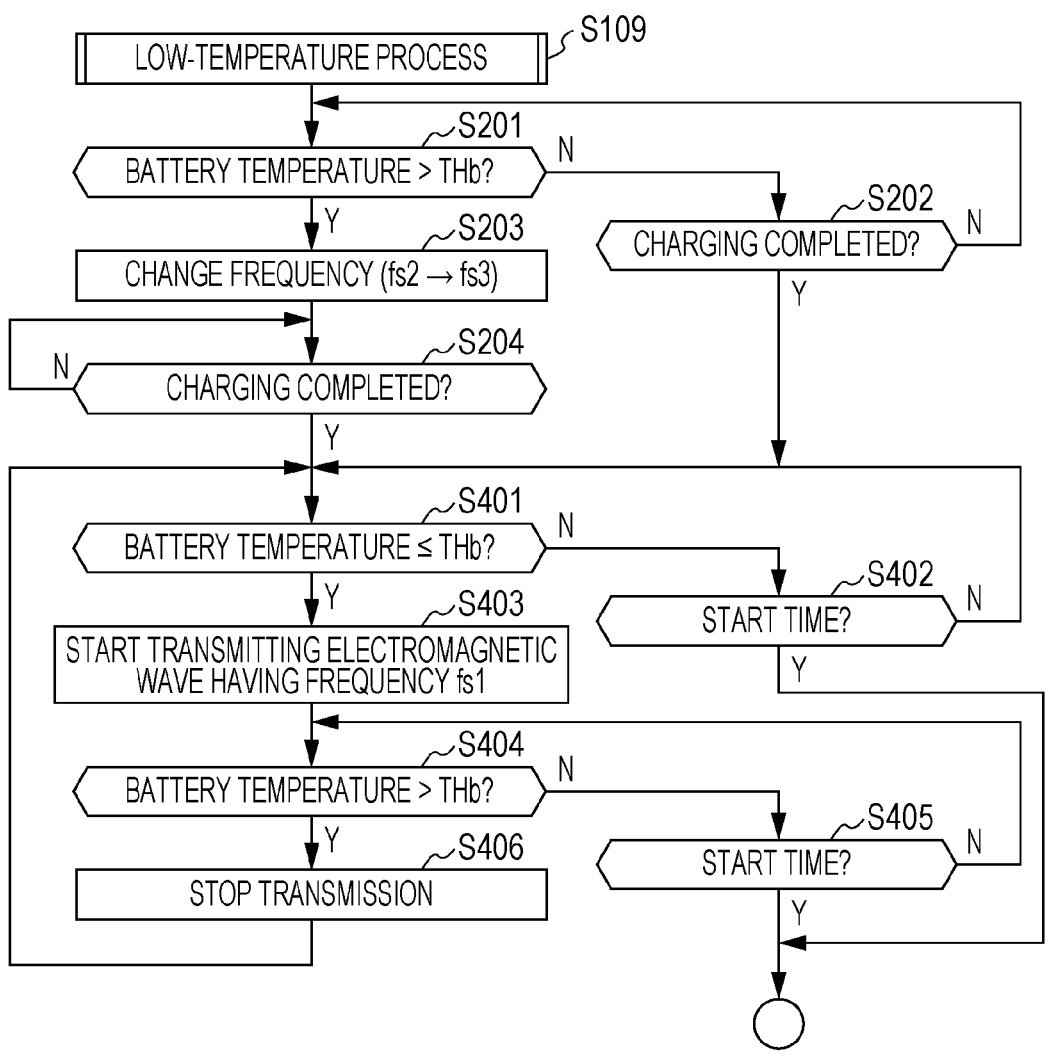
FIG. 9 is a flowchart of a low-temperature process according to a modification.

The low-temperature process of step S109 may be modified as illustrated in FIG. 9 in consideration of such a situation.

In the following description, components and steps that are the same or substantially the same as those already described are assigned the same reference signs and step numbers to omit a description. In addition, it is assumed that information about the start time is given by the controller 26 together with the aforementioned charge start instruction in this case, for instance.

As illustrated in FIG. 9, in this case, the controller 26 performs processing of step S401 and subsequent steps upon determining completion of charging in either one of steps S202 and S204.

The controller 26 waits for one of a condition that the battery temperature is lower than or equal to the threshold THb and a condition that the start time is reached being satisfied through of determination processing of steps S401 and S402.

Upon determining in step S402 that the start time is reached, the controller 26 ends the low-temperature process illustrated in FIG. 9.

Upon determining in step S401 that the battery temperature is lower than or equal to the threshold THb, the process proceeds to step S403, in which the controller 26 causes the power transmitter 21 to start transmitting an electromagnetic wave having the frequency fs1. That is, when the battery temperature decreases to be lower than or equal to the threshold THb again after the completion of charging, the state is shifted to the state in which temperature raising alone is mainly performed.

In response to the start processing of step S403, the process proceeds to step S404. The controller 26 waits for one of a condition that the battery temperature is higher than the threshold THb and a condition that the start time is reached being satisfied through determination processing of steps S404 and S405. Upon determining in step S405 that the start time is reached, the controller 26 ends the low-temperature process illustrated in FIG. 9.

Upon determining in step S404 that the battery temperature is higher than the threshold THb, the process proceeds to step S406, in which the controller 26 instructs the power transmitter 21 to stop transmitting the electromagnetic wave. The process then returns to step S401. In this way, transmission of the electromagnetic wave having the frequency fs1 is stopped after the battery temperature is raised again. If the battery temperature lowers thereafter again, the battery temperature is raised by transmitting the electromagnetic wave having the frequency fs1.

Note that a threshold different from the threshold THb may be used in the determination processing of steps S401 and S404.

Figure 10:
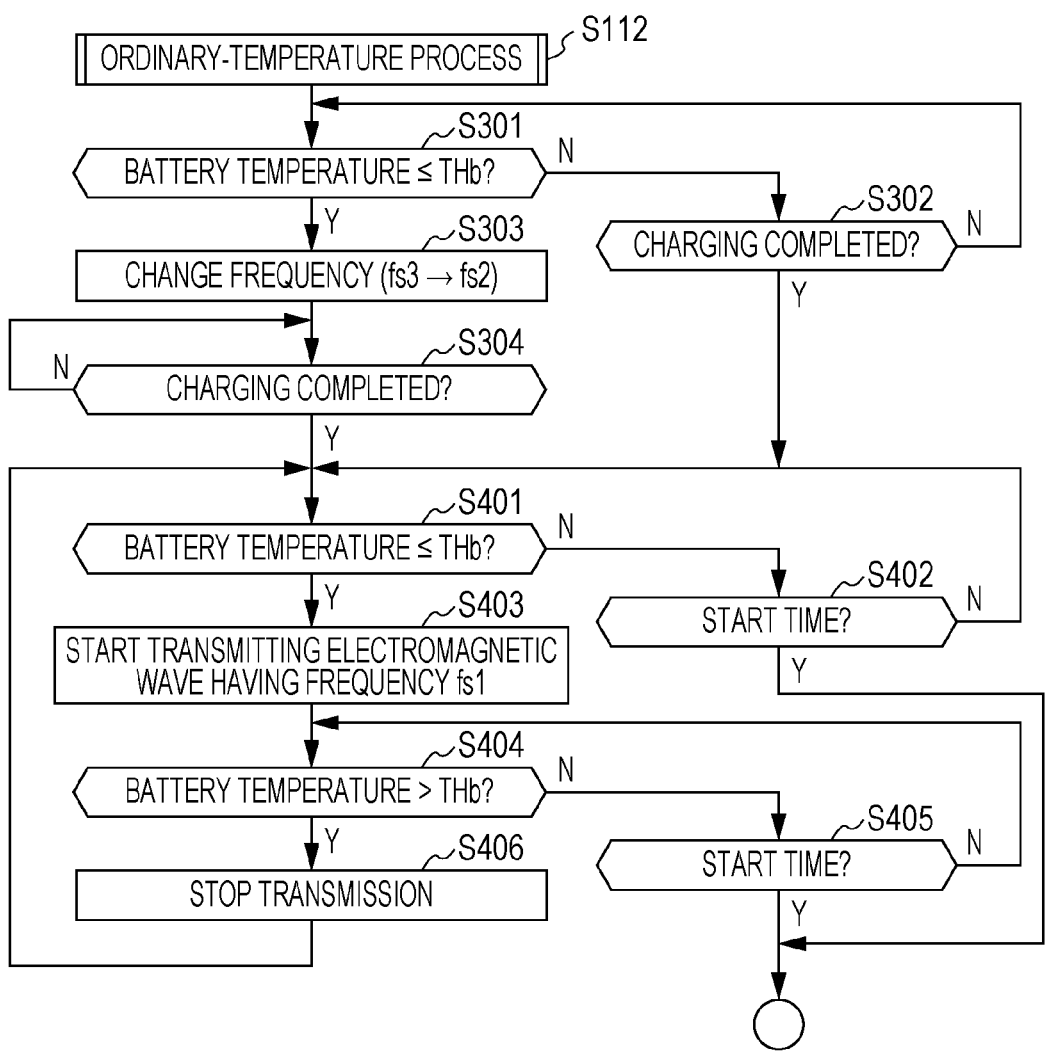
FIG. 10 is a flowchart of an ordinary-temperature process according to the modification.

FIG. 10 illustrates the ordinary-temperature process performed in step S112 in the case where the start time is set.

In this case, the controller 26 performs processing of step S401 and the subsequent steps (S401 to S406) upon determining the completion of charging in either one of steps S302 and S304. Since the processing of step S401 and the subsequent steps has already been described, a duplicate description is avoided.

In the case where the start time is set, the charge start timing may be controlled so that charging is completed immediately before the start time. In such a case, the above-described temperature raising after the completion of charging may be omitted.

In the above, only one kind of heat generator 10 is used for instance. Alternatively, two or more kinds of heat generators 10 having different heat generation bands Bh may be used in combination.

Figure 11:
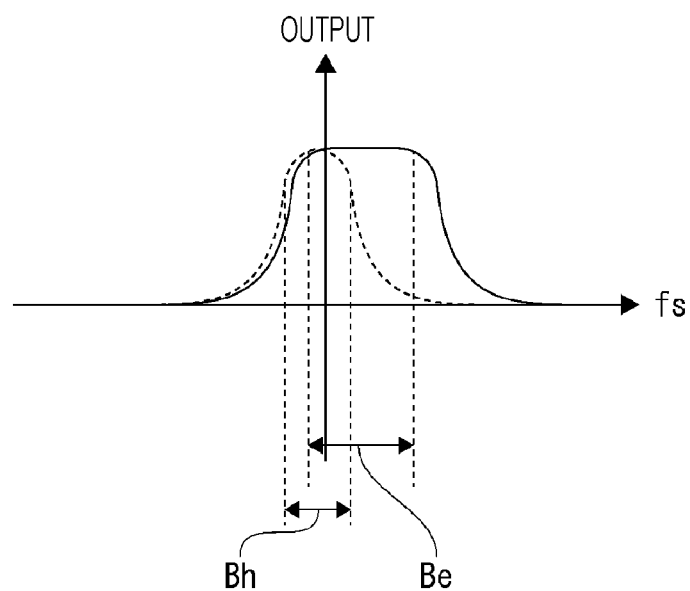
FIG. 11 is a diagram illustrating an exemplary case where a heat generation band of a heat generator is narrow.

For instance, depending on a material of the heat generator 10, the heat generation band Bh may be narrow as illustrated in FIG. 11 in the frequency characteristics for the electromagnetic wave. In the case where the heat generation band Bh is narrow in this way, a heat generator 10-1 having a heat generation band Bh-1 and a heat generator 10-2 having a heat generation band Bh-2 as illustrated in FIG. 12 are used in combination.

In this case, the heat generation band Bh-1 of the heat generator 10-1 is a frequency band lower than the heat generation band Bh-2 of the heat generator 10-2. The upper limit frequency of the heat generation band Bh-2 is lower than the upper limit frequency of the power generation band Be of the power receiver 12. The heat generation band Bh-1 does not overlap the power generation band Be but the heat generation band Bh-2 partially overlaps the power generation band Be.

Figure 12:
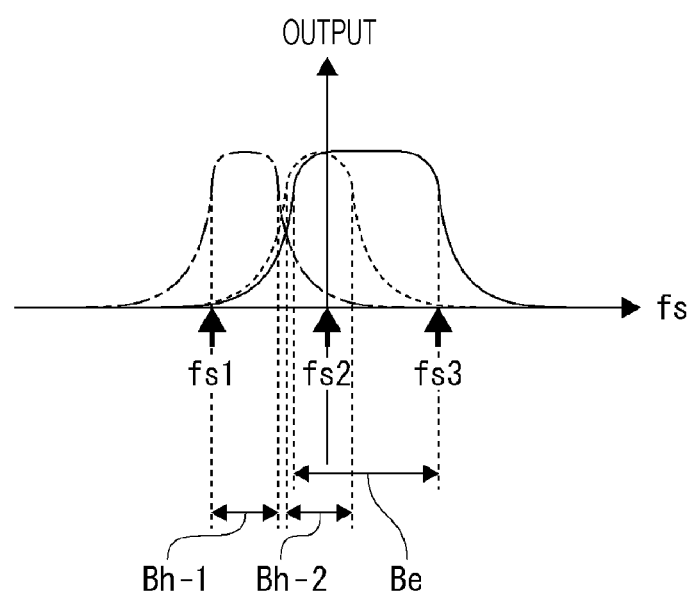
FIG. 12 is a diagram for describing an exemplary case where the frequency of an electromagnetic wave is adjusted using a plurality of heat generators having different heat generation bands.

In the case where the heat generators 10-1 and 10-2 are used in combination, the state in which both of charging and temperature raising are performed and the state in which charging alone is mainly performed are successfully implemented by setting the frequency of the electromagnetic wave to the frequency fs2 (a frequency in a part of the heat generation band Bh-2 that overlaps the power generation band Be) in FIG. 12 and by setting the frequency of the electromagnetic wave to the frequency fs3 (a frequency in a part of the power generation band Be that does not overlap the heat generation band Bh-2), respectively. In addition, by setting the frequency of the electromagnetic wave to the frequency fs1 (a frequency in the heat generation band Bh-1) in FIG. 12, the state in which temperature raising alone is mainly performed is successfully implemented.

Figure 13:
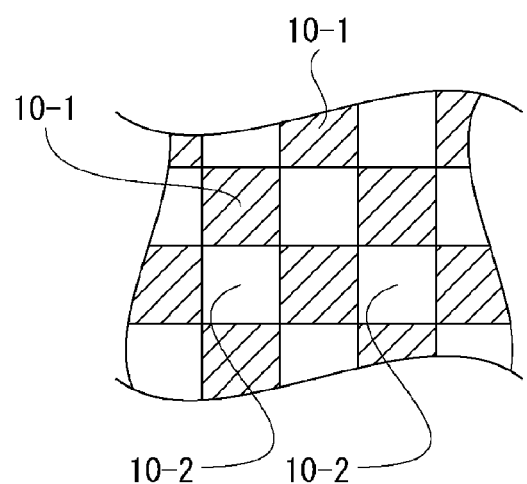
FIG. 13 is a diagram illustrating an exemplary arrangement of the plurality of heat generators having different heat generation bands.

FIG. 13 illustrates an exemplary arrangement of the heat generators 10-1 and 10-2.

Conceivably, the heat generators 10-1 and 10-2 are arranged alternately, such as in a lattice pattern, in this way. Such an alternate arrangement is effective in the case where the temperature raising efficiency is set to be substantially equal when the battery is charged and when the battery is not charged, for instance.

The use of the heat generators 10 having different heat generation bands Bh in combination can also provide following benefits.

Figure 14:
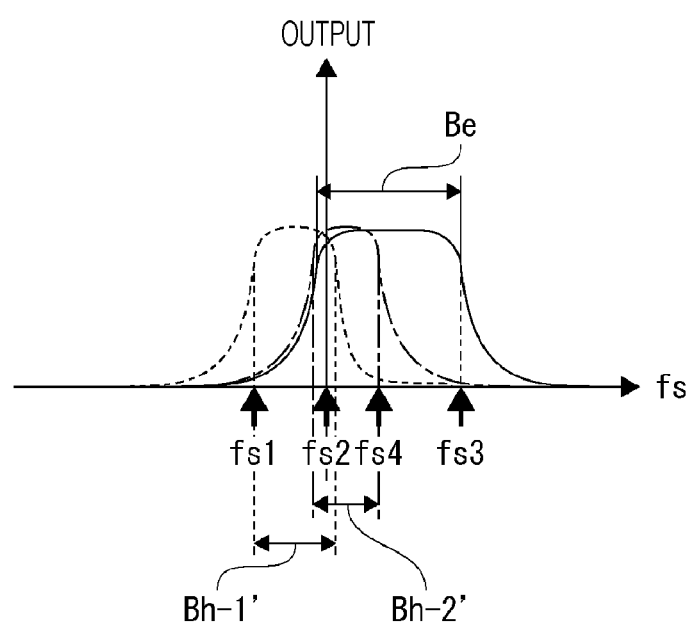
FIG. 14 is an explanatory diagram of a modification in which temperature raising efficiency is changed in steps by using a plurality of heat generators having different heat generation bands.

For instance, a heat generator 10-1' having a heat generation band Bh-1' and a heat generator 10-2' having a heat generation band Bh-2' as illustrated in FIG. 14 are used in combination. As illustrated in FIG. 14, the heat generation band Bh-1' has a lower limit frequency that is lower than that of the heat generation band Bh-2', and the heat generation band Bh-1' partially overlaps the heat generation band Bh-2'.

The heat generation band Bh-2' has an upper limit frequency that is lower than the upper limit frequency of the power generation band Be, and the heat generation band Bh-2' entirely overlaps a part of the power generation band Be. With such a heat generation band Bh-2', the heat generation band Bh-1', the heat generation band Bh-2', and the power generation band Be overlap one another in a band where the heat generation band Bh-1' overlaps the heat generation band Bh-2' in this case.

In the case where the above-described heat generators 10-1' and 10-2' are used in combination, the state in which both of charging and temperature raising are performed and the state in which charging alone is mainly performed are successfully implemented by setting the frequency of the electromagnetic wave to the frequency fs2 (a frequency in a frequency band in which the heat generation band Bh-1', the heat generation band Bh-2', and the power generation band Be overlap one another) in FIG. 14 and by setting the frequency of the electromagnetic wave to the frequency fs3 (a frequency in a part of the power generation band Be that does not overlap the heat generation band Bh-2'), respectively. In addition, by setting the frequency of the electromagnetic wave to the frequency fs1 (a frequency in a part of the heat generation band Bh-1' that does not overlap the heat generation band Bh-2') in FIG. 14, the state in which temperature raising alone is mainly performed is successfully implemented.

In this case, if the frequency of the electromagnetic wave is set to a frequency fs4 (a frequency in a part of the power generation band Be that overlaps the heat generation band Bh-2' alone), the amount of heat generated by the heat generator 10-1' is suppressed compared with the case where the frequency of the electromagnetic wave is set to the frequency fs2. That is, the temperature raising efficiency is successfully changed during charging between the case where the frequency of the electromagnetic wave is set to the frequency fs2 and the case where the frequency of the electromagnetic wave is set to the frequency fs4.

FIG. 14 illustrates an exemplary case where the temperature raising efficiency is changed in two steps by using two kinds of heat generators 10. Alternatively, the temperature raising efficiency may be changed in three or more steps by using three or more kinds of heat generators 10.

In addition, the exemplary case where the temperature raising efficiency is changed in steps while the battery is being charged has been described above. The temperature raising efficiency may be changed in steps also when the battery is not charged.

As described above, a vehicle according to an aspect includes a secondary battery, a power receiver configured to receive an electromagnetic wave to generate electric power, a charger configured to charge the secondary battery by using the electric power generated by the power receiver, a heat generator configured to receive the electromagnetic wave to generate heat, and a battery temperature raising unit configured to raise temperature of the secondary battery by using the heat generator as a heat source. In one example, the vehicle 1 may serve as the "vehicle". In one example, the assembled battery 11 may serve as the "secondary battery". In one example, the power receiver 12 may serve as the "power receiver". In one example, the charger 13 may serve as the "charger". In one example, the heat generator 10, 10-1, 10-1', 10-2, or 10-2' may serve as the "heat generator". In one example, the battery pack 5 may serve as the "battery temperature raising unit".

A part of a heat generation band does not overlap a power generation band, and a part of the power generation band does not overlap the heat generation band. The power generation band is a frequency band of the electromagnetic wave in which the power receiver has an increased power generation efficiency, and the heat generation band is a frequency band of the electromagnetic wave in which the heat generator has an increased heat generation efficiency.

With such a configuration, a state is successfully implemented in which an amount of electric power generated by the power receiver is suppressed and an amount of heat generated by the heat generator is increased by adjusting the frequency of the electromagnetic wave to a frequency in the heat generation band that does not overlap the power generation band. In addition, a state is successfully implemented in which the amount of electric power generated by the power receiver is increased and the amount of heat generated by the heat generator is suppressed by adjusting the frequency of the electromagnetic wave to a frequency in the power generation band that does not overlap the heat generation band.

Thus, as a vehicle charging system capable of charging a secondary battery of a vehicle and raising temperature of the secondary battery by using an electromagnetic wave transmitted by a power transmitter, a system capable of selectively performing charging and temperature raising without requiring displacement of the vehicle is successfully implemented.

In addition, another part of the heat generation band of the heat generator may overlap the power generation band.

With such a configuration, a state is successfully implemented in which both the amount of generated heat and the amount of generated electric power are increased by adjusting the frequency of the electromagnetic wave to a frequency in a band in which the heat generation band and the power generation band overlap.

Thus, a non-contact power feeding system capable of switching between a state in which one of charging and temperature raising is selectively performed and a state in which both of charging and temperature raising are performed is successfully implemented.

Further, the heat generator may have a sheet-like shape. Since the heat generator has a sheet-like shape, thickness of an additional member used to raise the temperature is suppressed.

Consequently, the battery temperature raising unit can be reduced in size and weight.

Moreover, the heat generator may be obtained by forming an aluminum film on a polyethylene terephthalate film.

The heat generator has good heat generation efficiency and is suitably used as a heat source by the battery temperature raising unit.

Thus, the temperature raising efficiency achieved by the battery temperature raising unit is successfully improved.

In addition, the battery temperature raising unit may include a plurality of the heat generators having different heat generation bands, each of the plurality of heat generators serving as the heat source.

With such a configuration, the degree of freedom in designing of the battery temperature rise characteristics against the frequency of the electromagnetic wave is increased.

For instance, as described by way of example above, the frequency band in which the temperature is raised is successfully extended even if heat generators having narrow heat generation bands are used.

In addition, the temperature raising efficiency is successfully controlled in steps.

In addition, a non-contact power feeding apparatus according to an aspect performs non-contact power feeding to a vehicle and includes a power transmitter configured to transmit an electromagnetic wave, and a controller configured to change a frequency of the electromagnetic wave transmitted by the power transmitter in accordance with temperature information. In one example, the non-contact power feeding apparatus 2 may serve as the "non-contact power feeding apparatus". In one example, the power transmitter 21 may serve as the "power transmitter". In one example, the controller 26 may serve as the "controller".

With such a configuration, in a vehicle including a power receiver that receives an electromagnetic wave to generate electric power, a charger that charges a secondary battery by using the electric power generated by the power receiver, a heat generator that receives the electromagnetic wave to generate heat, and a battery temperature raising unit that raises temperature of the secondary battery by using the heat generator as a heat source, charging and temperature raising can be selectively performed in accordance with temperature information in the case where a part of the heat generation band of the heat generator does not overlap the power generation band and a part of the power generation band does not overlap the heat generation band.

Since switching between charging and temperature raising is implemented by changing the frequency of the electromagnetic wave, a system capable of selectively performing charging and temperature raising without requiring displacement of the vehicle is successfully implemented.

Further, the controller may set the frequency in accordance with the temperature information and state-of-charge information of a secondary battery obtained from the vehicle, the secondary battery being installed in the vehicle and being charged using the electromagnetic wave.

With such a configuration, charging and temperature raising can be selectively switched between in accordance with the state of charge and the temperature.

Thus, the secondary battery is successfully charged appropriately and the temperature of the secondary battery is successfully adjusted appropriately in accordance with the state of charge and the temperature.

Moreover, after charging of the secondary battery is completed, the controller may cause the power transmitter to transmit the electromagnetic wave having a frequency allowing a heat generator to generate heat in accordance with the temperature information, the heat generator being configured to receive the electromagnetic wave to generate heat and being used as a heat source by a battery temperature raising unit included in the vehicle to raise temperature of the secondary battery.

With such a configuration, the temperature of the secondary battery is successfully raised when the secondary battery has a low temperature because the vehicle is left for a relatively long time after the completion of charging.

Consequently, the vehicle is allowed to start traveling in a state in which the secondary battery has a temperature that provides good output characteristics, which can consequently increase the driver's comfortableness.

It should be noted that the present invention is not limited to the specific examples described above, and various modifications are conceivable.

For instance, a technique based on resonance is used as the non-contact power feeding technique above. Alternatively, other non-contact power feeding techniques based on electromagnetic induction and radio wave reception may also be used.

In addition, it is not mandatory to perform charging of the secondary battery and raising of the temperature of the secondary battery in parallel. For instance, even in the case where the heat generator 10-1 having the heat generation band Bh-1 illustrated in FIG. 12 is used alone, the secondary battery can be charged while avoiding a decrease in the charging efficiency due to low temperature by alternately performing temperature raising and charging.

The controller 26 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 26. Such a medium may take any forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the controller 26 illustrated in FIG. 1.

The invention claimed is:

1. A vehicle comprising
    a power receiver configured to generate electric power above a first threshold by using an electromagnetic wave, transmitted from a power transmitter enabled to shift a frequency of the electromagnetic wave, of a frequency within a power generation frequency band;
    a charger configured to charge a battery installed in the vehicle by an electric power generated by the power receiver;
    a heat generator configured to generate heat above a second threshold by using the electromagnetic wave, transmitted from the power transmitter, of a frequency within a heat generation frequency band;
    a battery pack configured to accommodate the battery with the heat generator, and arranged at a space of the vehicle such that a coil of the power receiver faces a coil of the power transmitter; and
    a controller configured to make the power transmitter shift a frequency of the electromagnetic wave in accordance with the temperature of the battery,
    wherein the controller is configured to change the frequency among frequencies including:
        a first frequency included in a first frequency band overlapping
            the power generation band in which an amount of generated electric power is maintained at the first threshold or higher with
            the heat generation frequency band in which an amount of generated heat is maintained at the second threshold or higher
        a second frequency included in a second frequency band overlapping
            the power generation frequency band with a frequency band, in which an amount of heat generated by the heat generator is suppressed to be more than 0 and less than the second threshold, and
        a third frequency included in a third frequency band overlapping
            the heat generation frequency band with a frequency band, in which an amount of electric power generated by the power receiver is suppressed to be more than 0 and less than the first threshold.

2. The vehicle according to claim 1, wherein the heat generator is obtained by forming an aluminum film on a polyethylene terephthalate film.

3. The vehicle according to claim 1, wherein a battery temperature raising unit includes
    a plurality of the heat generators having different heat generation frequency bands, each of the heat generators serving as the heat source.

4. The vehicle according to claim 1, wherein a battery temperature raising unit includes
    a plurality of the heat generators having different heat generation frequency bands, each of the heat generators serving as the heat source.

5. The vehicle according to claim 2, wherein a battery temperature raising unit includes
    a plurality of the heat generators having different heat generation frequency bands, each of the heat generators serving as the heat source.

6. A non-contact power feeding apparatus configured to perform non-contact power feeding to a vehicle, the apparatus comprising:
    a power transmitter configured to transmit an electromagnetic wave to the vehicle; and
    a controller configured to shift a frequency of the electromagnetic wave in accordance with temperature information of a battery in a battery pack installed in the vehicle, the temperature information received from the vehicle, the battery pack configured to accommodate the battery with a heat generator configured to generate heat above a second threshold by using the electromagnetic wave transmitted from the power transmitter, of a frequency within a heat generation frequency band, the battery pack arranged at a space of the vehicle such that a coil of a power receiver faces a coil of the power transmitter, the power receiver configured to generate electric power above a first threshold by using the electromagnetic wave transmitted from the power transmitter enabled to shift a frequency of the electromagnetic wave, of a frequency within a power generation frequency band,
    wherein the controller is configured to change the frequency from among frequencies including:
        a first frequency included in a first frequency band overlapping
            the power generation band in which an amount of generated electric power is maintained at the first threshold or higher with the heat generation frequency band in which an amount of generated heat is maintained at the second threshold or higher a second frequency included in a second frequency band overlapping the power generation frequency band with a frequency band, in which an amount of heat generated by the heat generator is suppressed to be more than 0 and less than the second threshold, and a third frequency included in a third frequency band overlapping the heat generation frequency band with a frequency band, in which an amount of electric power generated by the power receiver is suppressed to be more than 0 and less than the first threshold.

7. The non-contact power feeding apparatus according to claim 6, wherein the controller sets the frequency in accordance with the temperature information and state-of-charge information of the battery obtained from the vehicle, the battery being installed in the vehicle and configured to be charged by using the electromagnetic wave.

8. The non-contact power feeding apparatus according to claim 7, wherein after charging of the battery is completed, the controller causes the power transmitter to transmit the electromagnetic wave having a frequency allowing a heat generator to generate heat in accordance with the temperature information, the heat generator being configured to receive the electromagnetic wave to generate heat and being used as a heat source by a battery temperature raising unit included in the vehicle to raise temperature of the battery.

9. The vehicle according to claim 1, wherein the controller switches the frequency of the electromagnetic wave transmitted by the power transmitter in accordance with temperature information of the battery heated by the heat generator where there is the part of the power generation band and heat generation band that does not overlap and the other part the power generation band and heat generation band that does overlap, and wherein the controller instructs the power transmitter to switch the frequency of the transmitted electromagnetic wave from among the frequencies including the first and second frequency to switch between charging and heating the battery.

10. The vehicle according to claim 1, wherein charging and temperature raising of the battery is selectively performed by the controller switching the frequency of the electromagnetic wave in accordance with temperature information from the battery.

11. The apparatus according to claim 6, wherein charging and temperature raising of the battery is selectively performed by the controller changing the frequency of the electromagnetic wave in accordance with temperature information from the battery.

12. The vehicle according to claim 1, wherein the controller is configured to cause the power transmitter to start transmitting an electromagnetic wave having the first frequency, when the temperature of the battery is lower than or equal to a first value.

13. The vehicle according to claim 12, wherein the controller is configured to switch the frequency from the first frequency to the second frequency, when the temperature of the battery is higher than the first value.

14. The vehicle according to claim 13, wherein the controller is configured to switch the frequency from the second frequency to a third frequency in the heat generation frequency band except the overlapping frequency band, when completion of charging of the battery is detected and the temperature of the battery is lower than or equal to the first value.

15. The vehicle according to claim 1, wherein the controller is configured to cause the power transmitter to start transmitting an electromagnetic wave having the second frequency, when the temperature of the battery is higher than a first value.

16. The vehicle according to claim 15, wherein the controller is configured to switch the frequency from the second frequency to the first frequency, when the temperature of the battery is lower than the first value.

17. The vehicle according to claim 16, wherein the controller is configured to switch the frequency from the first frequency to a third frequency in the heat generation frequency band except the overlapping frequency band, when completion of charging of the battery is detected and the temperature of the battery is lower than or equal to the first value.

18. The vehicle according to claim 1, wherein the heat generator is a sheet-like shape and attached to at least one side of the battery pack.

19. The vehicle according to claim 1, wherein the thickness of the heat generator in the battery pack is configured to be partially increasing to increase efficiency of raising temperature of the battery.

* * * * *